United States Patent [19]

McIlrath

[11] 3,848,462
[45] Nov. 19, 1974

[54] STRAIN CONTROL TRANSDUCER
[76] Inventor: William F. McIlrath, 3 Lemon St., Wright Patterson AFB, Ohio 45453
[22] Filed: June 29, 1973
[21] Appl. No.: 374,985

[52] U.S. Cl. .................................. 73/88.5 R, 73/91
[51] Int. Cl. ............................................. G01n 3/32
[58] Field of Search .......... 73/1 B, 91, 88 R, 141 A, 73/89, 88.5 R

[56] References Cited
UNITED STATES PATENTS

| | | | |
|---|---|---|---|
| 735,375 | 8/1903 | Hines | 73/161 |
| 3,327,270 | 6/1967 | Garrison | 73/88.5 R X |
| 3,602,041 | 8/1971 | Weinert | 73/91 X |
| 3,771,346 | 11/1973 | Huslin, Jr. | 73/141 A X |

Primary Examiner—Jerry W. Myracle
Attorney, Agent, or Firm—Biebel, French & Bugg

[57] ABSTRACT
A strain control transducer transfers a controlled amount of compression and/or tension strain from a strained surface to a strain transfer area on the transducer. A strain measuring device such as a strain gauge may be mounted on the transducer in the strain transfer area for measurement of strain at that point. The transducer preferably comprises a base member and two mounting members for the strain measuring device. The base member and one mounting member are mounted on a strained surface and the second mounting member is slidably mounted on the base member in abutting relationship to the first mounting member. The transducer is adapted to multiply the strain transferred from the strained surface to the measuring device by a factor greater than, equal to, or less than one, and the transducer may be biased to eliminate all or any portion of the strain cycle experienced by the strained surface. In an alternative embodiment the transducer reverses the transferred strain so that the measuring device experiences tension when the strained surface is under compression.

10 Claims, 7 Drawing Figures

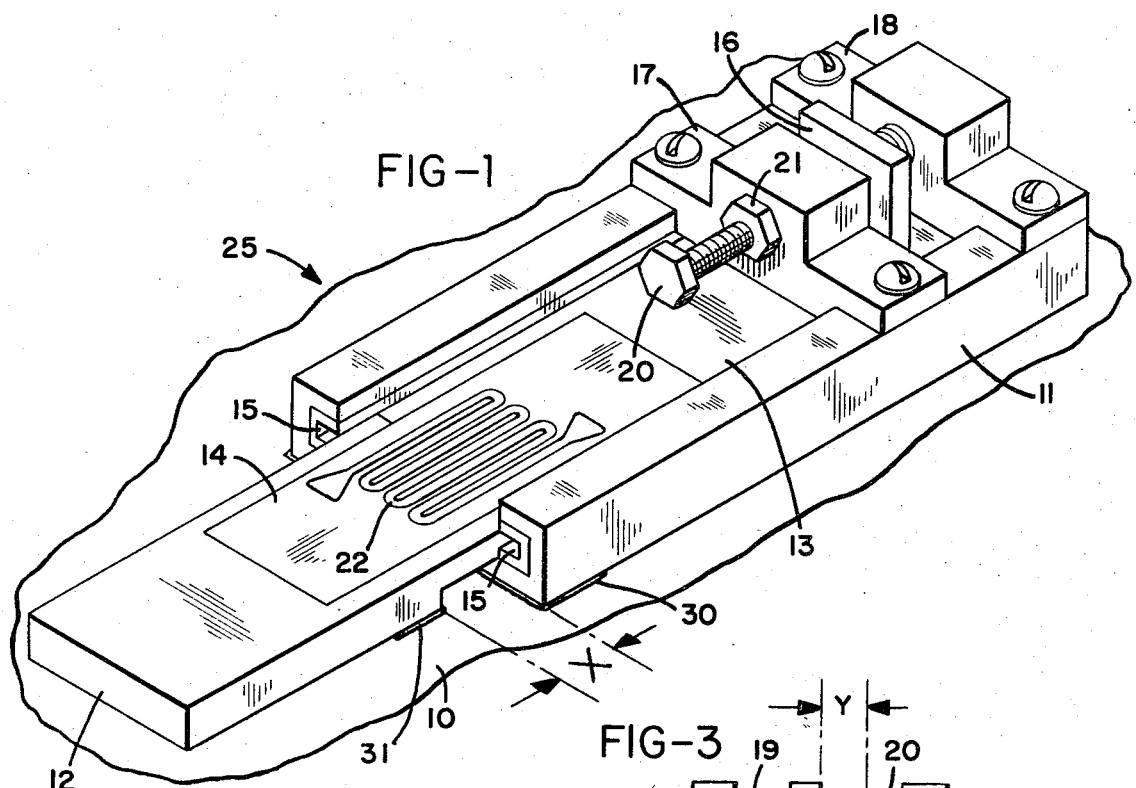
FIG-1
FIG-3
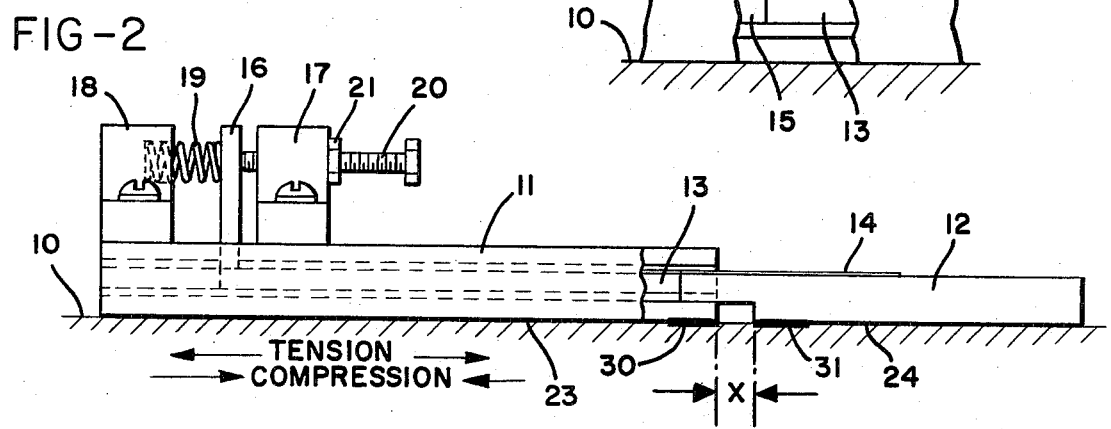
FIG-2
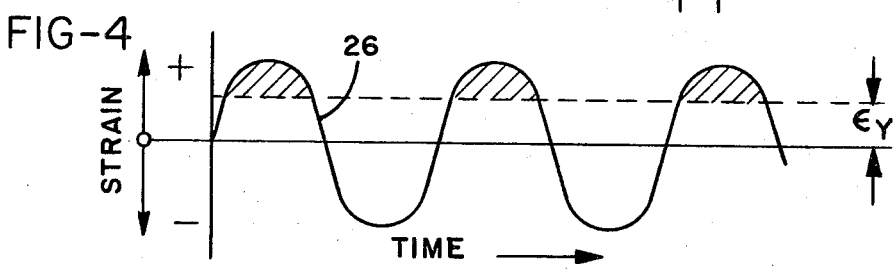
FIG-4

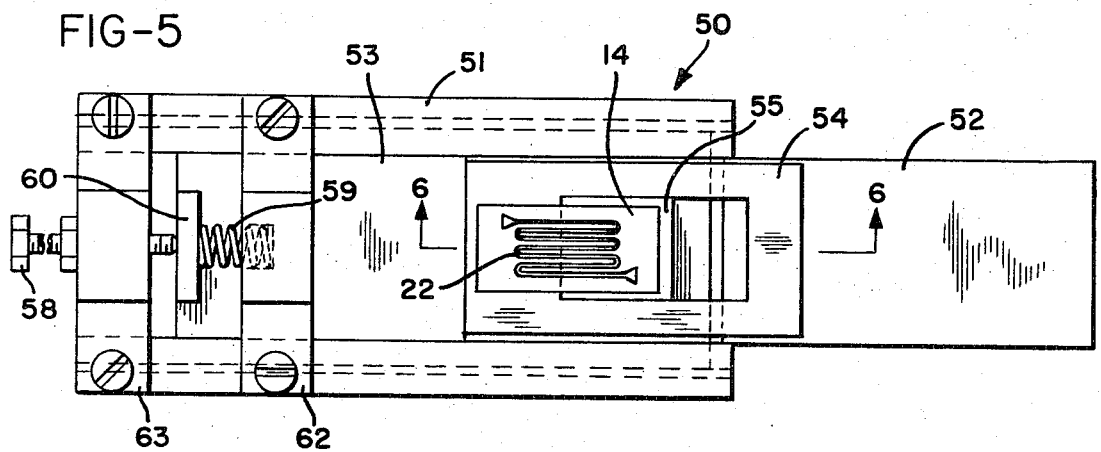
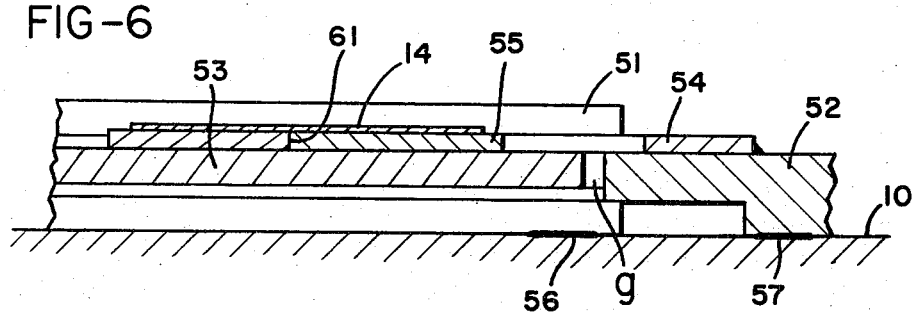
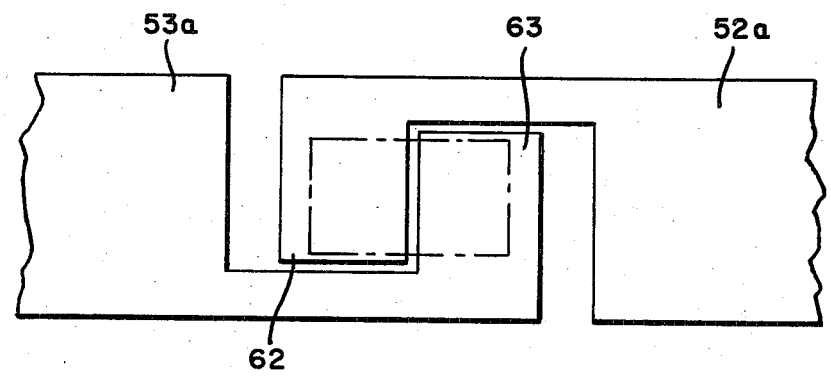

STRAIN CONTROL TRANSDUCER

BACKGROUND OF THE INVENTION

With the advent of concern for measuring or monitoring fatigue damage tolerance of materials to repeated loading, much time and effort has been applied to structural testing and analysis. Generally, to prevent structural failures, major structural members are frequently inspected for failures either destructively or nondestructively or monitored by means of complex flight recorders. Recorders keep parameter history records of flight usage which are, at a later time, analyzed to calculate damage or life expectancy of the structure. These procedures are usually costly and timely. Thus there has been developed a fatigue life gauge or fatigue sensor such as shown for instance in Harting U.S. Pat. No. 3,272,003 for giving a resistance or temperature coefficient reading directly related to the amount of structural damage at a point on a surface. Each stress cycle work hardens the gauge material to change its material characteristics, and therefore the gauge may be monitored to predict in a nondestructive way the remaining amount of fatigue life in the structure at a point.

It is well known that structural stresses (and strains), due to repeated loading, alternate about a mean value and that both tension and compression are involved. However, structural damage due to compressive strain is insignificant in comparison to the damage caused by tensile strain, and therefore it is desirable to measure the tensile component only. This has been difficult in the prior art, because fatigue life gauges have a peculiar characteristic in that they respond with the same positive accumulative change in resistance or temperature coefficient to either a compression or tension strain cycle. Heretofore there has been no simple means for achieving the desired separation of these two strain components, and therefore accurate predictions of fatigue life have required extensive instrumentation and tedious data reduction.

SUMMARY OF THE INVENTION

This invention provides a strain control transducer adapted to transfer all or any portion of a strain cycle from a strained surface to a strain measuring device. This is accomplished by providing a base member and two support members. The base member is mounted on the strained surface and one support member is mounted on the strained surface adjacent the base member. The second support member is mounted movably on the base member and cooperates with the first support member for defining a mounting surface for the strain measuring device.

Preferably the second support member is a plate slidably mounted within the base for abutting contact against the first support member. The strain measuring device is mounted on the two support members to bridge the abutment area. There is a spring and screw arrangement which limits motion of the second support member in the direction toward the first support member, so that tension in the strained surface produces separation of the two support members and straining of the strain measuring device. Then when the strained surface undergoes compression, the first support member bears against the second support member to move it backwards against the spring but without any straining of the strain measuring device. If desired, the transducer may be mounted with an initial bias adjustment so that the strain measuring device will be isolated from only a portion of the compressive strain experienced by the structure being monitored or from all of the compressive strain and any portion of the tensile strain.

In another embodiment of the invention the strain measuring device is mounted for stretching by the two support members when the strained surface goes into compression, so that there is a reversal in the transmitted strain. For this embodiment there may be an initial bias adjustment to eliminate transfer to the strain measuring device of any portion of the tensile strain experienced by the strained surface or all the tensile strain and any portion of the compressive strain. In either embodiment the first support member may be initially adjusted relative to the base member so as to provide any desired multiplication in the strain actually sensed by the strain measuring device.

Accordingly, it is an object of this invention to provide means for separating tensile strains from compressive strains and selectively transferring portions of either from a strained surface to a strain measuring device.

It is another object of the invention to reduce costly data reduction and analysis in structural fatigue life predicting.

Other objects and advantages of the invention will be apparent from the following description, the accompanying drawings and the appended claims.

BRIEF DESCRIPTION OF THE DRAWINGS

FIG. 1 is a perspective view of a strain control transducer according to this invention;

FIG. 2 is an elevation view of the transducer of FIG. 1;

FIG. 3 is an enlarged view of a portion of FIG. 2 showing the elements thereof adjusted to a different initial strain transferring position;

FIG. 4 is a diagrammatic illustration of a strain cycle;

FIG. 5 is a plan view of an alternative embodiment of the invention;

FIG. 6 is a view taken along lines 6—6 of FIG. 5, and

FIG. 7 is a plan view of a portion of another alternative embodiment of the invention.

DESCRIPTION OF THE PREFERRED EMBODIMENTS

Referring to the drawings, FIG. 1 generally illustrates a strain control transducer according to this invention. As illustrated therein a carrier 11 serving as a base member is bonded to a strained surface 10 along a narrow bond line 30. A stationary mounting plate 12, which serves as a first support member for a strain measuring device 14 is mounted to the strained surface 10 along another bond line 31 spaced apart from bond line 30 by a distance $x$. Strain measuring device 14 is provided with a resistive element 22 as described in the above mentioned Harting patent.

There is a slidable mounting plate 13 slidably mounted within carrier 11 to serve as a second support member for measuring device 14. Slidable plate 13 slides within a pair of channels 15, each of which may be lined with a nonwearing material such as plastic material sold under the trademark TEFLON. Preferably carrier 11, stationary mounting plate 12, and slidable mounting plate 13 are made of aluminum or other fairly rigid material. An upwardly extending tab 16 is mounted at one end of slidable plate 13, and the other end of plate 13 abuts stationary plate 12. (See FIG. 2). A pair of crossbars 17 and 18 are mounted on carrier 11 to face tab 16 on opposite sides thereof.

There is a spring 19 fixed in a recessed seat in crossbar 18 to bear against the one side of tab 16, and an adjustment screw 20 is threaded through crossbar 17 to extend toward the opposite side of tab 16. A lock nut 21 is provided for locking adjustment screw 20 into any desired initial position relative to the tab 16. Thus adjustment screw 20 may be adjusted for initial separation from tab 16 by a distance Y as shown in FIG. 3. The purpose for such an initial adjustment will be described presently.

For use under conditions wherein all tensile strains are to be sensed and all compressive strains are to be ignored, adjustment screw 20 is initially adjusted for slight touching contact against tab 16 under no load conditions. Further for such measurements carrier 11 and stationary mounting plate 12 are mounted to the surface 10 along bond lines 30 and 31 as shown in FIG. 1 with stationary mounting plate 12 butting against slidable mounting plate 13. Bond lines 30 and 31 may be located at any desired locations along bottom surfaces 23 and 24 of carrier 11 and mounting plate 12 respectively provided only that they are perpendicular to the longitudinal axis of transducer 25. Accurate spacing of bond lines 30 and 31 on surface 10 may be obtained by masking off a stripe on the surface and then applying a coat of adhesive thereover. After the masking tape has been removed, carrier 11 and stationary mounting plate 12 may be bonded in place with plate 12 butting against plate 13. Finally strain sensor 14 is bonded in place, taking care that no portion of the bond extends below resistive element 22. Thereafter when the surface 10 goes into compression the bond line distance X will shorten and mounting plate 12 will move toward carrier 11. Then since plate 12 is butting against mounting plate 13, mounting plate 13 will be forced backwardly and no strain will be experienced by resistive element 22. During this backward movement of mounting plate 13, tab 16 will compress the spring 19 to absorb the compressive strain transmitted to transducer 25 by the surface 10.

Later as the compressive load decreases to zero, tab 16 reapproaches adjustment screw 20. Then when surface 10 goes into a tensile strain condition, the bond line distance X begins increasing, and mounting plate 12 begins moving away from carrier 11. At this time adjustment screw 20 prevents movement of mounting plate 13 toward mounting plate 12, so that plates 12 and 13 begin to separate causing resistive element 22 to go into a state of tensile strain. The magnitude of the strain experienced by resistive element 22 may be adjusted by adjustment of the distance X. That is, the precentage increase in the distance X is directly proportional to the magnitude of the tensile strain in surface 10, so that by selecting initially larger values for X, greater plate separations may be achieved for any given strain level. It follows then that larger initial values of X will produce higher strain levels in the resistive element 22 during the tensile portions of the strain cycle in surface 10. Furthermore the apparatus will be seen to be adapted for multiplying the transmitted strain by any desired factor either greater or less than 1. The amount of multiplication in each case depends upon the length of resistive element 22 as well as the distance X. For example if element 22 is one-fourth inch long and the distance X is one-half inch, then the multiplication factor is 2. That is, resistive element 22 would experience twice as much tensile strain as would surface 10.

In a special case wherein it may be desired to isolate resistive element 22 from a portion of the tensile loads as well as all of the compressive loads in the strain cycle, transducer 25 may be mounted with an initial bias adjustment as illustrated in FIG. 3. Thus with adjustment screw 20 initially separated from tab 16 by a distance Y, mounting plate 13 may move relative to carrier 11 in the direction toward mounting plate 12 (i.e., toward the right as viewed in FIG. 3) during the initial portion of each tensile load application. After tension of surface 10 has progressed to the point where the separation between bond line 30 and 31 has increased by a distance Y, tab 16 comes into contact with adjustment screw 20, and mounting plate 12 begins to separate from mounting plate 13. At this point resistive element 22 begins to experience strain. This strain level may be denoted by $\epsilon_y$ as illustrated in FIG. 4. As shown in that figure, by the curve 26, the strain in surface 10 may oscillate sinusoidally between positive or tensile strains and negative or compressive strains. Whenever the tensile strain is greater than $\epsilon_y$, resistive element 22 experiences strain as shown by the shaded area under curve 26. At all other times during the strain cycle of surface 10, resistive element 22 is unloaded.

For other applications of the invention it is possible to make an initial negative bias adjustment so that resistive element 22 is strained for the entire tensile portion of the strain cycle and a part of the compressive portion as well. To bias negatively, adjustment screw 20 is screwed a slight distance inwardly after mounting of strain sensor 14. This produces tensile strain in resistive element 22 for a no load condition in surface 10. Resistive element 22 continues to be tensilely strained even during compression, and continues to be so strained until increasing compression of surface 10 moves tab 16 inwardly away from contact with adjustment screw 20.

In other cases it may be desired to produce reversal of the strain transmitted from surface 10 to resistive element 22. For this purpose there may be employed an alternative embodiment of the invention as illustrated by transducer 50 of FIGS. 5 and 6. Transducer 50 is similar to transducer 25 in that it comprises a carrier 51, a stationary mounting plate 52, and a slidable mounting plate 53. Slidable mounting plate 53 is fitted with an upstanding tab 60 which is urged by a spring 59 in the direction away from a first crossbar 62 and toward a second crossbar 63. Movement of the tab 60 is limited by adjustment screw 58 which corresponds to adjustment screw 20 of transducer 25. However, it will be noted that the positions of screw 58 and spring 59 are reversed relative to the positions of their counterparts in the embodiment of FIGS. 1 and 3.

In operation carrier 51 is bonded to surface 10 along a bond line 56, and stationary mounting plate 52 is bonded to surface 10 along a bond line 57, (see FIG. 6). After carrier 51 and mounting plate 52 have been bonded in place, adjusting screw 58 may be backed out to provide a gag g between plates 52 and 53.

There is a yoke 54 secured to plate 52 in overhanging relationship therefrom. Yoke 54 rests slidably on the upper surface of mounting plate 53 so as to surround a mounting slab 55. Mounting slab 55 is secured to mounting plate 53, and the above mentioned initial adjustment of screw 58 brings mounting slab 55 into abutting contact with yoke 54 along a contact line 61. Strain sensor 14 is overlappingly supported by mounting it on yoke 54 and slab 55 to bridge the contact line 61.

When the surface 10 goes into a compressive strain condition with transducer 50 mounted thereon, the distance between bond lines 56 and 57 decreases and the gap g begins to close. At the same time, adjustment screw 58 bears against tab 60 to prevent movement by mounting plate 53 and mounting slab 55. Consequently yoke 54 begins sliding inwardly across the upper surface of the mounting plate 53, and a gap begins to develop along the contact line 61. This introduces a tensile strain into resistive element 22. Thereafter when surface 10 goes into a tensile strain condition, yoke 54 again bears against mounting slab 55 along the contact line 61, and mounting plate 53 is pulled outwardly (i.e., to the right as viewed in FIG. 6). Thus any tensile strain transferred into transducer 50 from the surface 10 is absorbed by spring 59. Accordingly, for adjustment of transducer 50 as shown in FIG. 6, compressive strain in surface 10 is seen as tensile strain by strain sensor 14, while tensile strain in the surface 10 is not seen at all. It will be appreciated, however, that transducer 50 may be mounted with an initial bias adjustment (analogous to bias adjustment of transducer 25) so that it isolates strain sensor 14 from only a portion of the tensile strain experienced by surface 10 or from all the tensile strain and any portion of the compressive strain.

Strain reversal, as above described, may also be achieved without use of the yoke 54 or the mounting slab 55. This may be done by providing a transducer generally similar to transducer 50, but having an overlapping mounting plate configuration as illustrated generally by plates 52a and 53a of FIG. 7. In this configuration plate 53a is provided with a finger 63, and plate 52a is provided with a finger 62. To operate this configuration the transducer is initially adjusted to bring fingers 62 and 63 into contact. Thereafter the strain sensor is mounted in place in the region shown by phantom lines in FIG. 7. The operation of this embodiment is substantially identical to the operation of the embodiment of FIGS. 5 and 6.

While the forms of apparatus herein described constitute preferred embodiments of the invention, it is to be understood that the invention is not limited to these precise forms of apparatus, and that changes may be made therein without departing from the scope of the invention.

What is claimed is:

1. A strain control transducer comprising a carrier mounted on a strain surface, a stationary mounting plate mounted on said surface adjacent said carrier, a slidable mounting plate slidably mounted on said carrier, a strain measuring device mounted jointly on said slidable mounting plate and said stationary mounting plate, and means mounted on said carrier for limiting the sliding movement of said slidable mounting plate in one direction.

2. Apparatus according to claim 1 said movement limiting means being adjustable for biasing the strain transmitted by said mounting plates to said strain measuring device.

3. Apparatus according to claim 2 said slidable mounting plate being provided with an upwardly standing tab, and said movement limiting means comprising an adjustable screw bearing against said tab.

4. Apparatus according to claim 3 further comprising a spring for urging said tab against said screw.

5. Apparatus according to claim 4, said mounting plates being arranged for end to end abutting and jointly defining a mounting surface for bridged mounting of said measuring device.

6. Apparatus according to claim 5, said screw being arranged to limit movement of said slidable mounting plate in a direction toward said stationary mounting plate whereby said transducer transfers tensile strain to said measuring device; the amount of strain so transmitted during cyclical straining of said surface being limited in accordance with the adjustment position of said screw.

7. Apparatus according to claim 1 said mounting plates being arranged for overlapping support of a strain sensing device mounted on said transducer whereby compressive strains within said surface are sensed as tensile strains by said sensing device.

8. A strain control transducer comprising:
   a base member mounted on a strained surface, a first support member mounted on said strained surface adjacent said base member, a second support member mounted on said base member for limited movement relative to said base member and said first support member during distortion of said strained surface, and
   a strain measuring device mounted jointly on said first and second support members for straining by relative movement between said first and second support members.

9. Apparatus according to claim 1 said movement of the second support member relative to the base being limited in a first direction and relatively non-limited in a second direction whereby said transducer selectively isolates said strain measuring device from strains experienced by said surface.

10. Apparatus according to claim 9 said first direction being the direction toward said first support member whereby said transducer selectively isolates said measuring device from compressive strains experienced by said surface.

* * * * *